(12) United States Patent
Sumner

(10) Patent No.: US 6,782,475 B1
(45) Date of Patent: Aug. 24, 2004

(54) METHOD AND APPARATUS FOR CONVEYING A PRIVATE MESSAGE TO SELECTED MEMBERS

(76) Inventor: Terence E. Sumner, 5201 Panama Dr., Rowlett, TX (US) 75088

( * ) Notice: Subject to any disclaimer, the term of this patent is extended or adjusted under 35 U.S.C. 154(b) by 0 days.

(21) Appl. No.: 09/600,421

(22) PCT Filed: Jan. 15, 1999

(86) PCT No.: PCT/US99/00896
§ 371 (c)(1), (2), (4) Date: Jul. 13, 2000

(87) PCT Pub. No.: WO99/37052
PCT Pub. Date: Jul. 22, 1999

(51) Int. Cl.[7] .............................. H04L 9/00; H04K 1/00
(52) U.S. Cl. ...................... 713/163; 713/201; 380/255
(58) Field of Search ................................ 713/163, 201; 380/255–257, 270, 33; 709/201, 107, 220, 223, 225, 227, 237

(56) References Cited

U.S. PATENT DOCUMENTS

| | | | | |
|---|---|---|---|---|
| 5,450,493 A | * | 9/1995 | Maher | 380/30 |
| 5,748,084 A | * | 5/1998 | Isikoff | 340/568.1 |
| 5,961,646 A | * | 10/1999 | Sokol | 713/201 |
| 6,072,795 A | * | 6/2000 | Poulter | 370/352 |
| 6,101,608 A | * | 8/2000 | Schmidt et al. | 713/202 |
| 6,119,236 A | * | 9/2000 | Shipley | 713/201 |
| 6,130,892 A | * | 10/2000 | Short et al. | 370/401 |
| 6,272,639 B1 | * | 8/2001 | Holden et al. | 713/201 |
| 6,643,698 B2 | * | 11/2003 | Holden et al. | 709/225 |

* cited by examiner

Primary Examiner—Thomas R. Peeso
Assistant Examiner—Kambiz Zand
(74) Attorney, Agent, or Firm—Melvin A. Hunn

(57) ABSTRACT

An encrypted broadcast messaging system determines the management crypto-keys held by each selected subscriber device and not held by each excluded subscriber device of a group. The private message is decomposed into message-parts, one message-part per an excluded subscriber device, each message-part intended to be encrypted using each management crypto-key held by the selected subscriber devices and not held by the excluded subscriber device. Each message-part is encrypted using the intended management crypto-keys, and delivered to at least the selected subscriber devices, identifying the message-parts delivered and the message-parts necessary to re-compose the private message. Each received encrypted message-part is decrypted using the intended management crypto-key, and the necessary message-parts are chosen from which the private message is re-composed by combining in the selected subscriber devices.

52 Claims, 12 Drawing Sheets

| Subscriber Device A | Management Keys 1-2- - |
| Subscriber Device B | Management Keys 1- -3- |
| Subscriber Device C | Management Keys 1- - -4 |
| Subscriber Device D | Management Keys -2-3- |
| Subscriber Device E | Management Keys -2- -4 |
| Subscriber Device F | Management Keys - -3-4 |

FIG. 6

| Message ID (705) | Message Parts Attached (702) | Complete Flag (704) | Message Parts Needed (703) | Attached Message Parts (701) |
|---|---|---|---|---|
| 1 | | Y | 1 | Private Message |
| 2 | | N | 1- -3 | Message-Part 2 |
| 2 | | N | 1-2-3 | Message-Part 2 |
| SK-27 | 101110000000100 | | 15 | MP1 ⊕ MP3 ⊕ MP4 ⊕ MP5 ⊕ MP13 |

FIG. 7

| Excluded Devices | Management Keys held in Subscriber Device | Residua of Management Keys for Subscriber Device | Message Part |
|---|---|---|---|
| Subscriber A1 | 1-2-3-4-5-6- - - - - - - | - - - - - -7-8-9-10-11-12 | 1 |
| Subscriber Q7 | - - - - - -7-8-9-10-11-12 | 1-2-3-4-5-6- - - - - - | 2 |
| Subscriber H6 | - - -4-5-6- - - -10-11-12 | 1-2-3- - - -7-8-9- - - | 3 |

One of Selected Subscriber Devices

| Subscriber M5 | 1-2-3- - - -7-8-9- - - |

Receives

| 2 2 2 | | 1 1 1 |
|---|---|---|
| ⊕ | | ⊕ |
| 3 3 3 | | 3 3 3 |

Resultant Message Parts after Precombining

| 2 | 2 | 2 | 2 | 1 | 1 | 1 | 1 |
|---|---|---|---|---|---|---|---|
| ⊕ | | | | ⊕ | | | |
| 3 | 3 | 3 | | 3 | 3 | 3 | |

Additional Resultant Message Parts Supplied

| 2 | or | 3 | OR | 1 | or | 3 | on MK-1, -2, or -3    on MK-7, -8, or -9

*FIG. 9*

| Message ID | Message Parts Attached | Attached Message Parts |
|---|---|---|
| MP-1 | 1000000000000000 | 01011110 10111000 11101010 01101001 01100010 10100111 11110000 |
| MP-3 | 0010000000000000 | 10111000 01011110 11110000 11101010 01101001 00100011 01100010 |
| MP-4 | 0001000000000000 | 10111000 11101010 01011110 01100010 10100111 01101001 11010000 |
| MP-5 | 0000100000000000 | 01011110 10111000 01101001 11110000 11101010 01100010 00100011 |
| MP-13 | 0000000000000100 | 01011010 01101011 11101010 10111000 01100010 10101101 10010000 |

Resultant Message-Part of MP1 ⊕ MP3 ⊕ MP4 ⊕ MP5 ⊕ MP13

| SK-27 | 1011100000000100 | 01011010 11011111 11000111 10101001 00100100 00100010 11110001 |

FIG. 10

METHOD AND APPARATUS FOR CONVEYING A PRIVATE MESSAGE TO SELECTED MEMBERS

TECHNICAL FIELD

This invention relates in general to encrypted broadcast messaging systems, and more specifically to a method and apparatus for conveying a private message, such as a session crypto-key, to selected members of a group in an encrypted broadcast messaging system; however, the present invention may also be utilized to encrypt and securely transmit digital content, such as audio, video, multimedia, and software objects over insecure channels.

BACKGROUND ART

Modern encrypted broadcast messaging systems can convey an encrypted message to a plurality of subscriber devices (SDs) through well-known encrypted broadcast techniques. Broadcast encrypted messages have typically been used for delivery of encrypted video, encrypted audio, and encrypted data. Popularly, such systems operate on a subscription basis. Such systems also can deliver a message conveying a session crypto-key to a group of subscriber devices through well-known group messaging techniques. A session typically lasts for the payment period of the subscription. Group messages have proven to be a highly efficient tool for conveying information to large groups of subscribers through a single broadcast transmission. One example of such a commercial application is the satellite transmission of premium programming such as video and audio products.

A limitation of prior art encrypted broadcast messaging systems has been an inability to deliver a private message containing, for example, a session crypto-key efficiently and privately only to a selected sub-group of members of the group using a current session crypto-key, the separate session crypto-key typically being the crypto-key for the next subscription payment period. That is, all subscriber devices capable of receiving and decrypting an encrypted group message using a current session crypto-key have been able to decrypt a subsequent transmission of a separate session crypto-key intended only for selected members of the group. To prevent excluded members of the group from receiving and decrypting such a separate session crypto-key intended for the rest of the group, addressing capability was built into subscriber devices limiting capture of the information in a message containing the separate session crypto-key only to addressed subscriber devices. Continuing with the commercial example, the excluded members would represent subscribers that have accounts that are past due. This type of operation has worked reasonably well for many systems, but does not work as well for preventing unauthorized pirate reception using tampered subscriber devices or purpose-built devices having the addressing capability overridden. As an alternative approach some subscriber devices have incorporated a second unique individual crypto-key, allowing individual transmissions of any message, including a separate session crypto-key, encrypted uniquely to each of the plurality of selected subscriber devices in the group. This has worked reasonably well for small groups and in groups whose members substantially change authorization to receive, but transmitting a session crypto-key to each of the individuals of a large group generates a lot of traffic and is inefficient.

Thus, what is needed is a method and apparatus for conveying a private message only to selected member subscriber devices of a group. Preferably, the method and apparatus will retain the high efficiency characteristics of prior art group broadcast encrypted messaging techniques, while adding a significant degree of exclusion of members of the group not selected as well as other unauthorized recipients.

DISCLOSURE OF INVENTION

An aspect of the present invention is a method in an encrypted broadcast messaging system for conveying a private message to selected subscriber devices of a group of subscriber devices, all subscriber devices of the group having at least a first and second management crypto-keys. Of course, each subscriber may possess more than two crypto-keys, but two keys are required to achieve the minimum gain in efficiency offered by this invention. The method comprises the step of determining the collection (the Union) of management crypto-keys held by the selected subscriber devices and for each subscriber device having at least one crypto-key from the Union and not selected to received the private message a Residuum of crypto-keys in the Union not held by the subscriber device. Unique sets of management crypto-keys are assigned and pre-programmed into the subscriber devices of the group such that each of any two subscriber devices in the group has at least one management crypto-key from the management crypto-keys assigned to the group that the other subscriber device does not have, each management crypto-key being unique from all other crypto-keys. Pre-programming of management crypto-keys is desirable to prevent possible eavesdropping, lessen the traffic load on the communication channel, and reduce the lead time prior to delivering a private message, but pre-programming is not required. The method further comprises the step of decomposing the private message into message-parts, at least one message-part for each of the subscriber devices of the group not selected, that is, to be excluded, the message-part being associated to the excluded subscriber device and the management crypto-keys held by it. Each message-part is intended to be encrypted using management crypto-keys held by the selected subscriber devices and not held by the associated excluded subscriber device. The method further comprises the step of encrypting the message-parts, each message-part being encrypted using at least one of the intended management crypto-keys, by encrypting a copy of each message-part. The method further comprises the step of delivering the necessary encrypted message-parts to at least the selected subscriber devices of the group, the message-parts delivered and the message-parts necessary to form the private message by a subscriber being identified in delivery or determined in reception. The method further comprises the step of decrypting at least one of encrypted message-parts received by the selected subscriber devices using an intended management crypto-key. The method further comprises the step of choosing by the selected subscriber devices sufficient decrypted message-parts to form the private message from the identified necessary message-parts and the message-parts received, and forming the private message by combining.

Another aspect of the present invention is a subscriber device in an encrypted broadcast messaging system for obtaining a private message delivered to selected member subscriber devices of a group. The subscriber device comprises a receiving interface for receiving a message-part encrypted using a management crypto-key. The subscriber device further comprises a processing system coupled to the receiving interface for processing the message-parts. The processing comprises decrypting the message-parts using an intended management crypto-key, choosing from the at least one decrypted message-parts at least one message-part sufficient to re-compose the private message, and forming a private message by combining the chosen message-parts.

Another aspect of the present invention is a group manager (GM) for delivering a private message only to selected member subscriber devices of a group. The group manager comprises a source interface for receiving subscriber authorizations. The authorizations identify the subscriber devices to be selected to receive a private message, the private message being provided by the source. The group manager further comprises a processing system coupled to the source interface for processing the authorizations into key-sets and for decomposing the private message into message-parts and for encrypting the message-parts according to the key-sets. The processing system further forms the message-parts and key-sets into messages that can be utilized by subscriber devices in the group, identifying the message-parts delivered and message-parts necessary to form the private message. The processing system comprises a conventional computer system and storage, with mass storage for larger systems. The computer system performs the processing preferably utilizing a group database stored in the mass media storage recording the association of the management crypto-keys to each of the subscriber devices in the group, from which sets of management crypto-keys are identified. These key-sets, the Union of management crypto-keys of all selected subscriber devices and the Residua of management crypto-keys one Residuum for each excluded subscriber device, along with the associated crypto-keys, are used to perform encryption processing utilizing encryption programming also stored in the mass media storage. Residuum is the sub-set of the Union which does not intersect the set of management crypto-keys held by the excluded subscriber device. The group manager also comprises a distribution interface coupled to the processing system for delivering the message-part messages to a distribution communication network.

A further aspect of the present invention is a method in an encrypted broadcast messaging system for conveying a private message to selected subscriber devices of a group of subscriber devices wherein the method further comprises a pre-combining step and a supplying step. The encrypting step further comprises the step of pre-combining the decomposed message-parts into first resultant message-parts, one for each of the plurality of management crypto-keys held by the selected members, prior to encrypting. The encrypting step further comprises the step of supplying prior to encrypting to at least those of the selected member subscriber devices that cannot form the private message from the first resultant message-parts alone, second resultant message-parts. Second resultant message-parts are formed by pre-combining the decomposed message-parts in combination sufficient to allow all selected subscriber devices to form the private message by combining received resultant message-parts. The set of second resultant message-parts may be empty.

A further aspect of the present invention in the group manager for delivering a private message to selected member subscriber devices of a group is additional processing of the message-parts to pre-combine the decomposed message-parts into first resultant message-parts, one resultant for each of the management crypto-keys in the Union, prior to encrypting. The additional processing further comprises supplying prior to encrypting to those of the selected member subscriber devices that cannot form the private message from the first resultant message-parts alone, second resultant message-parts. Second resultant message-parts are formed by pre-combining the decomposed message-parts in combination sufficient to allow all selected subscriber devices to re-compose the private message by combining received resultant message-parts.

In the preferred embodiment of the present invention, a management key is a message which is transmitted to the authorized and intended subscribers in a secure broadcast transmission. However, the present invention may be utilized for the secure transmission of digital content, including, but not limited to, audio products, video products, multimedia products and software objects such as data and programs. In order to implement such an embodiment it will be necessary to segment the digital content into subparts, and then encrypt each subpart utilizing different secret crypto keys.

In alternative embodiments, the present invention may utilize security devices other than, or in combination with, private crypto keys. For example, alternative security devices may be utilized. Such security devices include security protocols, security algorithms, mathematical functions, methods of processing, software security devices, hardware security devices, any combination software-hardware security devices, hash functions, serial numbers, clock values, initial values, random variables, initialization vectors, and any security value determined by cyclic process. In such an implementation, the present invention is directed to a method of securely broadcasting a message from a message source over an insecure communication channel to included communicants, but not to excluded communicants. The method is composed of a number of method steps. First, a set of private security devices is provided. The set may include one or more of the above-identified security devices. Next, a subset of the security devices is provided to each communicant. For example, one communicant may be given a particular public key-private key pair and a particular mathematical function, while another communicant may be given a hash function and a shared-secret key. All that is required is that each communicant have a unique subset of the security devices taken from the set of available security devices, as compared to all other communicants. Next, the included communicants and excluded communicants are identified. As a practical matter, the excluded communicants may be subscribers that are past due on their accounts, or subscribers which have not paid for a particular type of premium service. Then, particular ones of the private security devices are selected from the set of available private security devices through a combination of (1) analysis of the security device allocation among the included communicants and excluded communicants, and (2) potential decomposition of the message. Then, the particular selected ones of the private security devices are utilized to encrypt particular portions-of the message. The encrypted form of the message is then communicated over an insecure communication channel. Then the included communicants are allowed to utilize the particular ones of the private security devices, which are in their possession, to decrypt the message. Those excluded communicants are not able to decrypt the message, since they lack one or more of the security devices necessary to decrypt or decipher one or more of the message subparts.

The foregoing and additional objectives are achieved as follows.

The above as well as additional objectives, features, and advantages will become apparent in the following description.

BRIEF DESCRIPTION OF DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

FIG. 6 is an exemplary assignment of management crypto-keys in member subscriber devices of a group in accordance with the present invention.

FIG. 7 is a message structure diagram of exemplary message-part datagrams in accordance with the present invention.

FIG. 9 is an exemplary detailed diagram incorporating pre-combining and supplying in accordance with the present invention.

FIG. 10 is an exemplary assignment of management crypto-keys in member subscriber devices of a larger group.

Table I is a tabular representation of the total number of subscribers which may be serviced utilizing a particular number of private crypto keys.

BEST MODE FOR CARRYING OUT THE INVENTION

Figure 1:
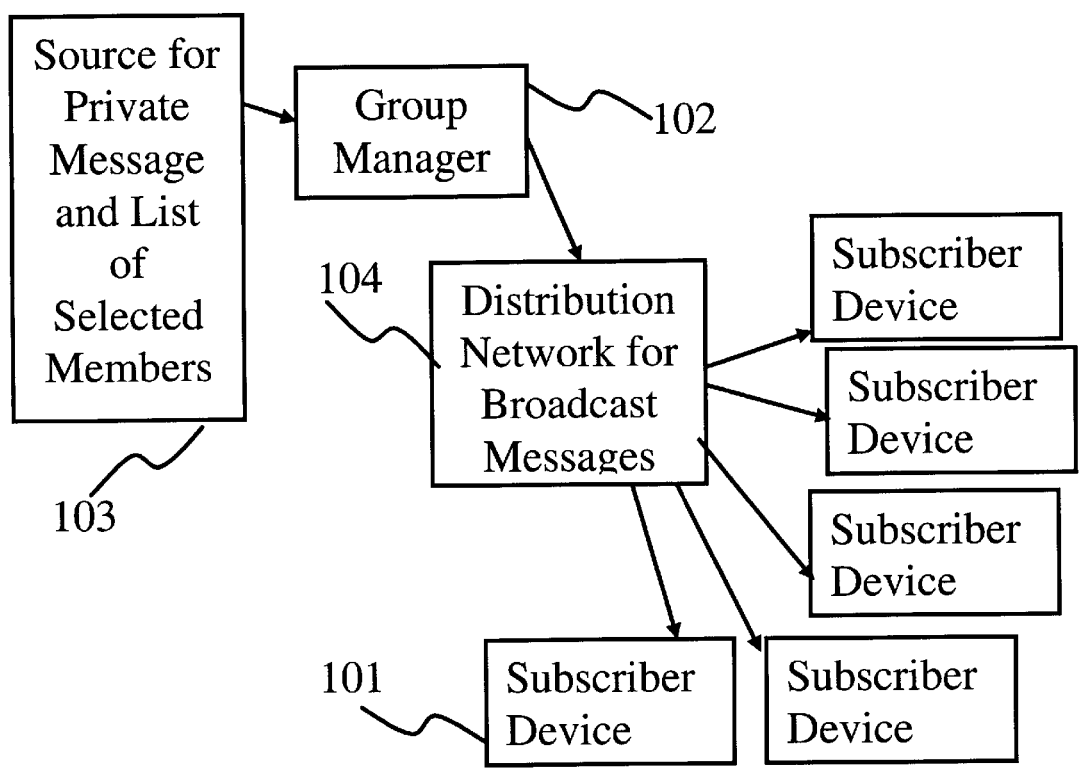
FIG. 1 is an electrical block diagram of an encrypted broadcast messaging system in accordance with the present invention.

Referring to FIG. 1, an electrical block diagram of an encrypted broadcast messaging system in accordance with the present invention comprises a source 103 that provides a private message and a list of selected subscribers to a group manager 102, which communicates the private message securely only to the selected member subscriber devices 101 in the group via the communication network 104 for distribution. The communication distribution network 104 is preferably a broadband cable with a head-end transmission station, or as well could be a satellite with up-link and down-link to direct broadcast receivers, or terrestrial radio base stations transmitting to personal pagers, or Internet-like store-and-forward data systems linking to host computers by modem and T-1, or physical distribution media when time and cost permit. Preferably, the subscriber devices 101 are similar to conventional cable television set-top decoder boxes for premium pay channels. The source 103 for the list of selected subscriber devices, preferably, is a list of authorizations from the billing system for the cable company's operation, being interfaced into a data channel on the cable itself. The private message is, preferably, the group subscription crypto-key for program distribution, such as for premium pay channels, for the next billing period. The group manager 102 is preferably similar to controllers for set-top decoder boxes for premium pay channels. Similarly, DBS receivers, dot-matrix LCD pagers, or PC's running web browsers or accepting "push" information flows can all serve as subscriber devices. Integrating the control channel with subscribed information to avoid a separate connection is economical, but not required. Integrating the private delivery of a session crypto-key with encrypted subscribed information permits the session crypto-key to be kept physically inside the same decoder box with the encrypted subscribed information decoding, as well, affording a more robust security approach.

Figure 2:
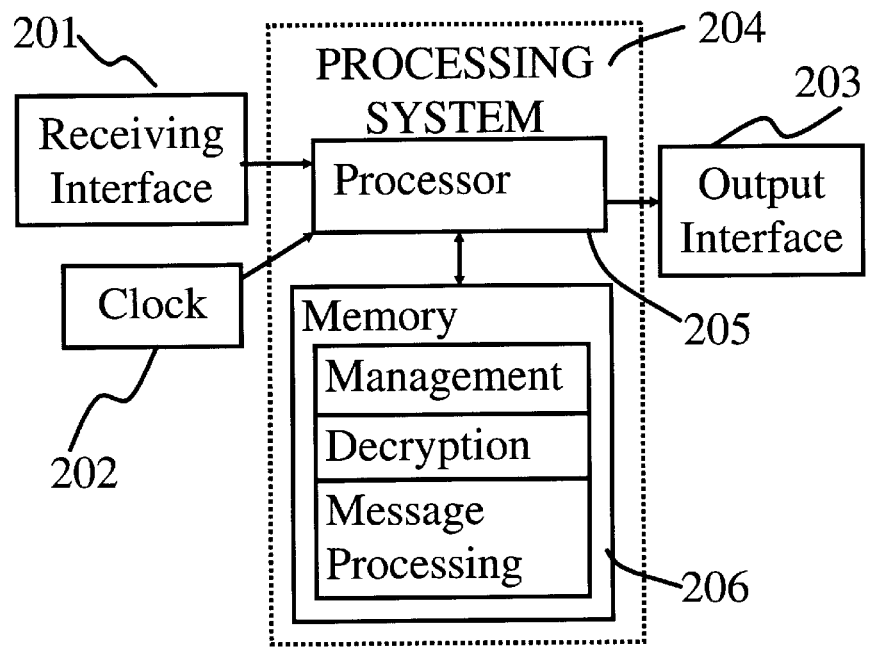
FIG. 2 is an electrical block diagram of a subscriber device in accordance with the present invention.

Referring to FIG. 2, in a subscriber device 101 the processing system 204 comprises preferably a microcomputer processor 205, such as Motorola's 68HC11 series with a stored programmed in its internal memory. External memory may be used but is more vulnerable to security tampering. The input to the processing system 204 is a receiving interface 201 and a clock 202. The receiving interface 201, preferably, is connected to direct data broadcast channel, such as in DSS, although connection to data decoders reading control data from line 21 of a NTSC video signal on a control channel is envisioned. In store-and-forward systems the receiving interface 201 can be a simple TCP-IP stack port, application level messaging, or some other identifiable data stream. The processing system 204 is coupled to an output interface 203 of the subscriber device.

The output interface 203 may pass the private message, when available, to a display for the user, or preferably it may pass the private message to an application program running in the processing system 204. For security reasons it is desirable to have the encryption engine not separated physically from the crypto-keys so as to hinder attempts to steal keys. The memory 206 contains the management crypto-keys, the decryption and the message-processing programming. In addition the memory 206 preferably holds session crypto-keys for the decryption program for subscribed information, and preferably all reside in internal memory of the microcomputer so that unprotected crypto-keys are not transferred outside the microcomputer chip. The memory 206 stores management crypto-keys, at least one for each group the subscriber device belongs to. Small groups may require only a few management key (MK) slots, while medium-sized groups may require a half-dozen to a dozen key slots, and large groups may require upwards of a dozen key slots.

Unique combinations of management keys are computed using the classic $n!/k!(n-k)!$. For n MKs the maximum number of SDs that can be uniquely managed is where k is n/2. For 4 MKs at most 6 SDs $[4!/2!(2)!]$ may be uniquely managed. Table I shows that for 12 management crypto-keys (MKs) up to 924 subscriber devices (SDs) may be uniquely managed, each SD having a set of 6 of the 12 MKs unique from all other SDs. A subscriber device having 16 slots allows up to 601,080,390 uniquely controllable members in the group.

"Unique" means different; it could be intersecting but at least one key is excluded from each other single set. The preferred method of making them unique is to assign at least n management keys, where n-select-n/2 is greater than the size of the whole group including selected and excluded members. Then each member is given n/2 of the keys. In its simplest form, each set of keys is not a subset of any other set, although they, may intersect, and all sets have at least one key that all other sets do not have. (At its maximum usage of n-select-n/2, exactly one key of the n/2 will be different in each set from all other sets). This can be calculated as a Fibonacci number. Other methods to guarantee uniqueness may be employed but this n-select-n/2 method, yielding group sizes of Fibonacci numbers is the simplest and preferred. Making subgroups within groups is possible, reducing the maximum group size from a Fibonacci number, while matching expected need for utilization of private message delivery.

Session keys typically need to be stored during use and a new one stored prior to switchover; thus, for each secured service at least two slots are required for the session keys. Preferably, the same decryption processing is applied to both subscribed information and encrypted private message-parts, this being advantageous in small portable devices. Security or battery considerations, however, may dictate different crypto engines or processing in subscribed information messaging and in private messaging. If the group manager delivers large numbers of message-parts, storage for these intermediate results is needed. Choice of symmetric versus asymmetric crypto engines depends upon security requirements and processing and power considerations; as does length of key used. Only the decomposition method can change the security. The output interface, preferably, connects the decrypted subscribed information to presentation software and hardware, such as video decompression to conventional CRT display and audio processing to stereo speakers, or data to LCD displays. A clock 202 is connected to the processing system 204 to run the processor 205, supplying clocking pulses as well as providing for calendar and time of day synchronization, preferably being a part of the microprocessor support, circuitry. Synchronized crypto switchover is a highly desired feature in a system incorporating crypto-key changes, necessitating a calendar and time of day clock with reasonably good accuracy, although identification of the crypto-key to use works reasonably well. Interfaces to the processing system are shown as providing one-way data flows, but equally two-way data flows may be utilized where appropriate, especially to reduce the effects of errors.

Figure 3:
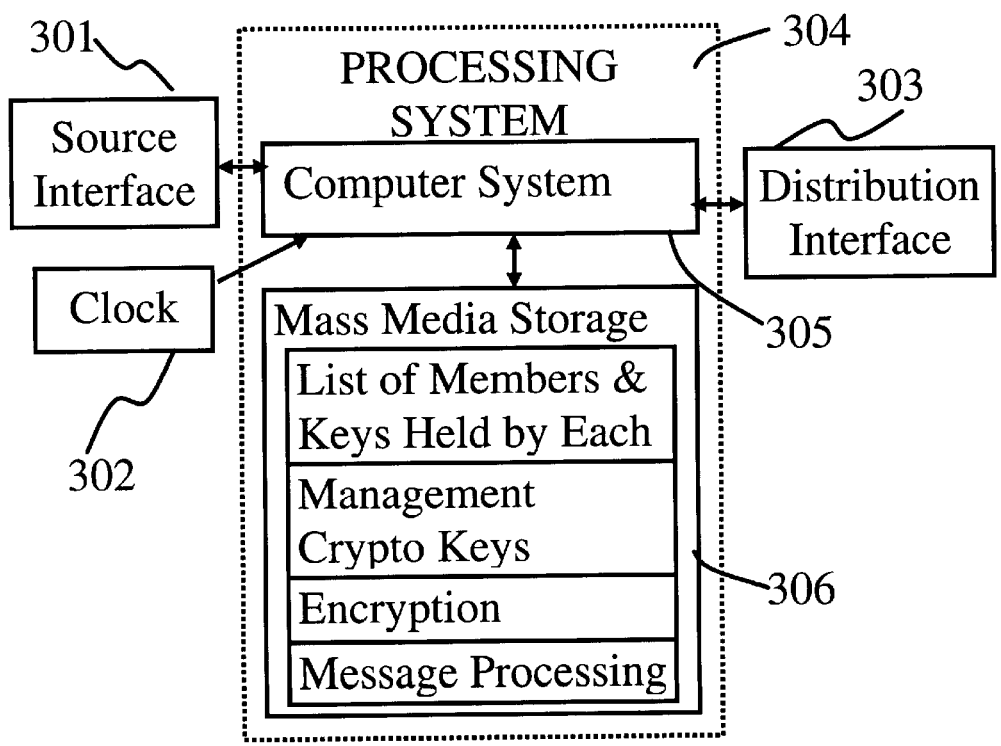
FIG. 3 is an electrical block diagram of a group manager in accordance with the present invention.
Figure 4:
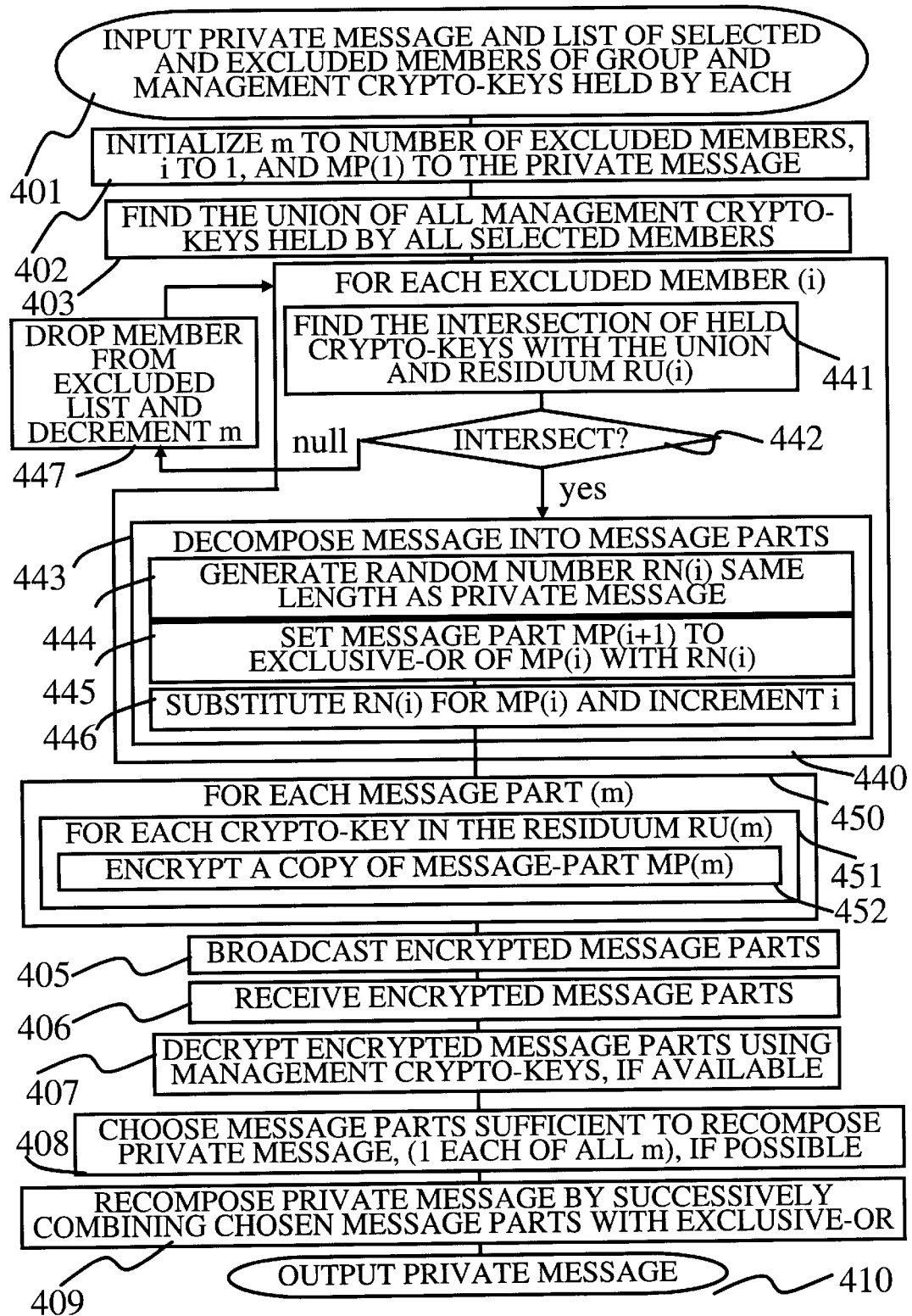
FIG. 4 is a system flow chart of an encrypted selective group broadcast messaging system in accordance with the present invention.

Referring to FIG. 3, a group manager 102, being a complementary structure to the subscriber device 101, is depicted. The source-interface 301 can also be used for receiving subscribed information in the same way, such as video, audio and data. This interface 301 preferably is connected to a source of a list of authorized subscriber devices selected to receive the private message. Once inputted, the association of management crypto-keys to each subscriber device can be stored in the GM. Preferably, such storage is protected from tampering. The private message is preferably a group session crypto-key. A clock 302 is connected to the processing system 304 to run the computer system 305, supplying clocking pulses as well as providing for calendar and time of day synchronization, preferably being a part of the computer system 305 itself. Within the processing system 304 are a computer system 305 and mass storage 306. A workstation computer, such as Sun's Sparc™ series, is preferably the computer system 305, and conventional hard-disc storage is attached to the computer for mass-media storage 306. The distribution interface 303 preferably connects the high-speed output to an up-link encoder for satellite distribution. Similar in structure to the subscriber device, the storage 306 holds the management crypto-keys, preferably with a database relating the management crypto-keys held by each subscriber device to the keys themselves, software to compute the sets of keys, such as the Union held by selected subscriber devices and Residuum not held by each of an excluded subscriber device, decomposition software to decompose private messages into message-parts, encryption software to encrypt the message-parts according to the key-sets, and messaging software to put the resulting encrypted message-parts into datagram form usable by the subscriber devices, and distribution interface software to communicate according to the protocols used by the distribution network. Preferably, session keys, management keys and other sensitive information are stored in the mass media storage in protected form. Two-way data flows are shown, but equally one-way data flows may be utilized where appropriate. Referring to FIG. 4, a system flow chart describes the operations as they occur in the system. A private message, such as a session crypto-key, entering the system along with a list of authorized (selected) recipient subscriber devices starts the process in step 401. From the list the management key-sets are recalled for the selected subscribers and the Union of those MKs is calculated in step 403. The select list may contain an enumeration of all authorized subscriber devices, only excluded devices, or may simply name the list to be used with additions or deletions, or both. Thus, the excluded subscriber devices may be enumerated or derived from the list of selected recipients. For each excluded subscriber device the key-set is recalled and compared to the Union in step 441. If no management crypto-keys are common (null intersection, Residuum equals Union), then the excluded subscriber device will be excluded by no further action than not sending the private message encrypted on the keys in its key-set. No message part is needed for such a subscriber and the number of message-parts is decremented in 447.

If there is at least one (non-null intersection) common management key, then the Residuum key-set is calculated by taking the remainder of the Union after removing the intersection of the key-set of the excluded subscriber and the Union. The Residua are the management crypto-keys that can be used to convey private message-parts to selected subscriber devices, excluding the particular subscriber device for each Residuum. The first message-part is initially set to the private message itself in step 402. If all excluded subscriber devices have null intersection with the Union of management crypto-keys of selected subscriber devices, then no decomposition is required. For each excluded subscriber device with a non-null intersection (m), a message-part is generated by decomposing the first message-part or its cumulative decomposition as in step 445. Other than the first message part, message parts are random numbers of length equal to the private message. The last message part is the cumulative decomposition of the private message successively using all the other message-parts.

Decomposition functions abound. Commutative functions that can be taken in any order are best. Rotations are possible but limited to small numbers, such as less than the number of bits in the key. This implies Field arithmetic as preferred. Simplicity suggests binary functions, but Galois field in $2^k$, working on k bits at a time rather than 2, is a reasonable extension, appearing to give an additional method to decompose, but any arithmetic function may be used. Any string function such as masking may be built up from exclusive-OR functions, except that those requiring a particular order might include OR or NOT functions. Any linear string function or commutative arithmetic function is acceptable.

The collection of message-parts decomposed from the private message is then encrypted using the Residua key-sets, one copy of a message-part encrypted for each management key in a key-set as in 450–452. The encrypted message-parts are distributed by broadcast 405 through the distribution network 104 to at least the selected subscriber devices 101. Distributing encrypted message-parts to other devices, especially the excluded ones, presents no risk of compromise. If the Union of management crypto-keys for the selected subscriber devices covers the entire group already, then again no risk of compromise is presented in distributing more widely than the selected ones, even to non-members, especially since it is assumed that they have no management keys in common with the selected subscriber devices. On reception 406 of encrypted message-parts, available message-parts if identified are analyzed to choose message-parts sufficient to re-compose the private message in 408. Message-parts are decrypted 407 and combined into the private message in 409. The sequence of decryption followed choosing can be reversed if identification of encrypted message-parts can be accomplished without decryption or is implied in delivery. Decryption of all available message-parts regardless of duplication is possible but uses time and power. Choosing without identifying message-parts can work well if the number of message-part combinations is small. For large numbers of combinations, identification and selection based on optimum choice for time and power and availability is superior. Re-composition of the private message, preferably by exclusive-ORing, from all the message-parts can be accomplished in any order if a commutative function is used (exclusive-OR, e.g.). In step 410 the private message is disposed of by the output function. A proper disposition may be to route a session crypto-key to the decryption storage area and record its applicability. The private message could just as well be a text message to be routed to a display for a large group to receive privately.

Figure 5:
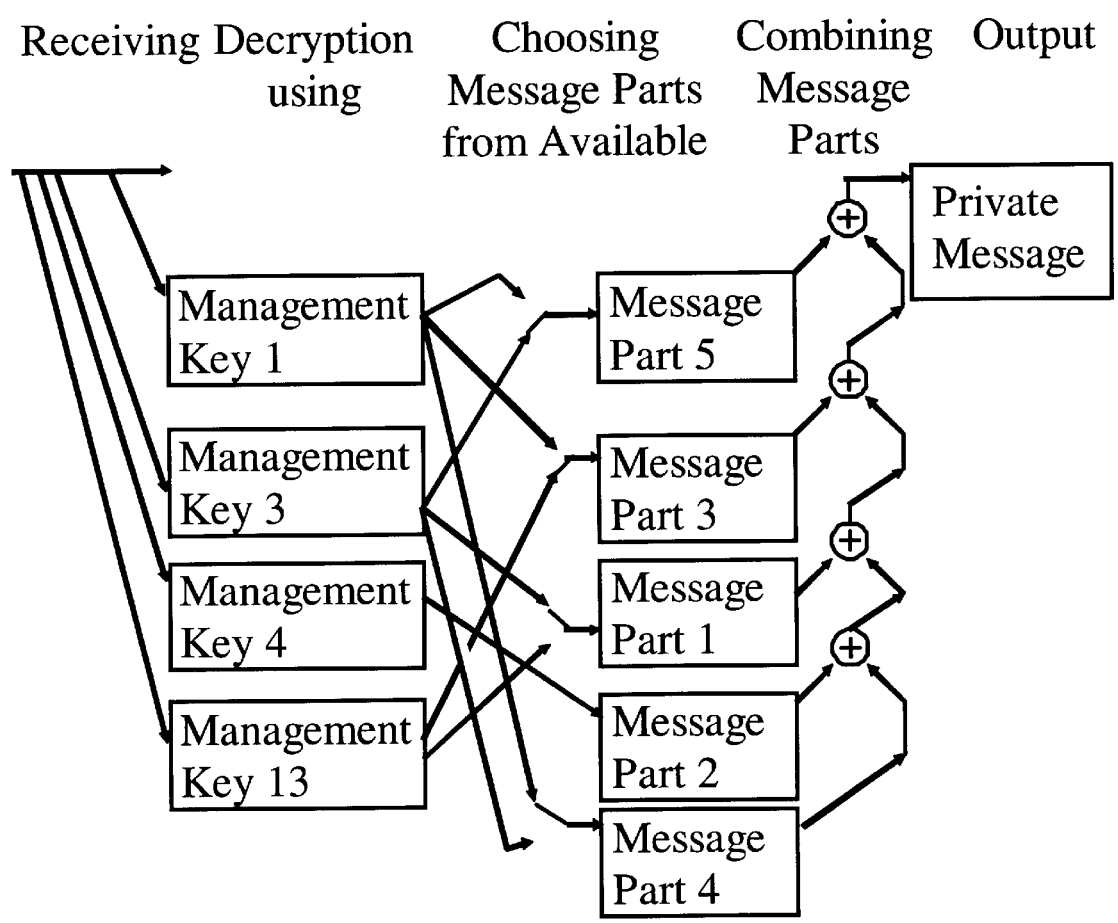
FIG. 5 is a functional diagram of message-part decryption and re-composition into a private message in accordance with the present invention.

Referring to FIG. 5, in receiving and re-composition of private message, an example subscriber device is shown holding MK-1, -3, -4, . . . and -13. MP1 is decrypted from both MK3 and MK13. Only one correct copy is needed. MP2 is available from MK4, MP3 from MK1 or MK13, MP4 from MK1 or MK3 and MP5 from MK1 or MK3 also.

The private message is re-composed by combining (preferably by bit-by-bit exclusive-OR) one copy of each of all the message parts. Even if multiple copies are available, only one is used. The subscriber device can, by trial and error, determine if it had successfully received all parts of the private message, but preferably the datagram identifies all message-parts needed and those conveyed. If some message-parts had been re-combined prior to encryption, then the subscriber device likewise can by trial and error determine a set of message-parts that will result in the private message when combined. Preferably, though, the datagram containing the encrypted message-part or resultant re-combined message-part indicates the parts contained and the parts required to re-compose the private message.

Referring to FIG. 6, in management crypto-key assignments-examples, four Management Crypto-Keys (MK) are used in this exemplary system, having at most 6 Subscriber Devices (SD) manageable uniquely. Each SD holds exactly 2 of the MKs, no 2 SDs having the same set of MKs. Three SDs have MK1, 3 have MK2, 3 have MK3 and 3 have MK4, but none have all of the MKs, while each SD has a unique combination of them. By contrast, the Group Manager has all 4 MKs.

To exclude SD-C from receiving a session key the Group Manager (GM) cannot send the session key on MK1 or MK4. Sending the session key on MK2 and MK3 both will allow each SD, except C, to receive a copy. SD-D will actually be sent 2 copies of the key. Redundant message-parts are expected to occur in this invention. In a further example, to exclude SD-C and SD-D the Group Manager (GM) cannot send the session key on MK1 or MK4, nor on MK2 or MK3. Sending the session key is accomplished by first decomposing the session key into 2 key-parts (MPs).

MP1 is sent on MK2 and MK3 and MP2 is sent on MK1 and MK4. Preferably, MP2 is a random number and MP1 is the session key exclusive-ORed with MP2.

All SDs except C and D will receive a copy of both MP1 and MP2. SD-D will be sent 2 copies of MP1, and SD-C will be sent 2 copies of MP2, neither case providing the session key. By appropriately combining MP1 and MP2 all selected SDs will have the session key.

Referring to FIG. 7, message-part datagram diagram depicts a exemplary messages conveying the message-part encrypted using a particular management crypto-key. The datagram can contain an indication of what other message-parts are needed to construct the private message and identify them. Lacking indication of other necessary message-parts, the subscriber device can check combinations of message-parts until it finds a satisfactory one, but handheld devices typically operate from battery making identification desirable. If pre-combining of message-parts prior to transmission is done, then the combination of message-parts is identified. Lack of indicated additional MPs necessary can indicate that the private message is complete, or a simple flag can indicate that the MP is the complete private message. The first example is a message-part that is complete in itself, requiring no other message-parts. If variable length fields are used, a simple Complete flag and the private message comprise the whole datagram. A second example shows the message divided into 3 parts, this datagram carrying message-part 2 and being marked the 2nd and needing the 1st and 3rd message-parts. A third example shows a re-combined resultant message-part of parts 1, 3, 4, and 5, lacking 2 and 6 to make the private message complete. A last example shows that the private message is a session key identified as 27, the datagram conveying parts 3, 4, 5, and 13 re-combined, needing parts identified as 1 through 15, i.e. missing 1, 2, 6–12, and 14–15. A variety of indications are possible. It will be appreciated that it may also be desirable in a large active system to identify a private message to which a message-part applies. Identification of message-parts can include the private message, such as which session, the message-parts belong to.

Figure 8:
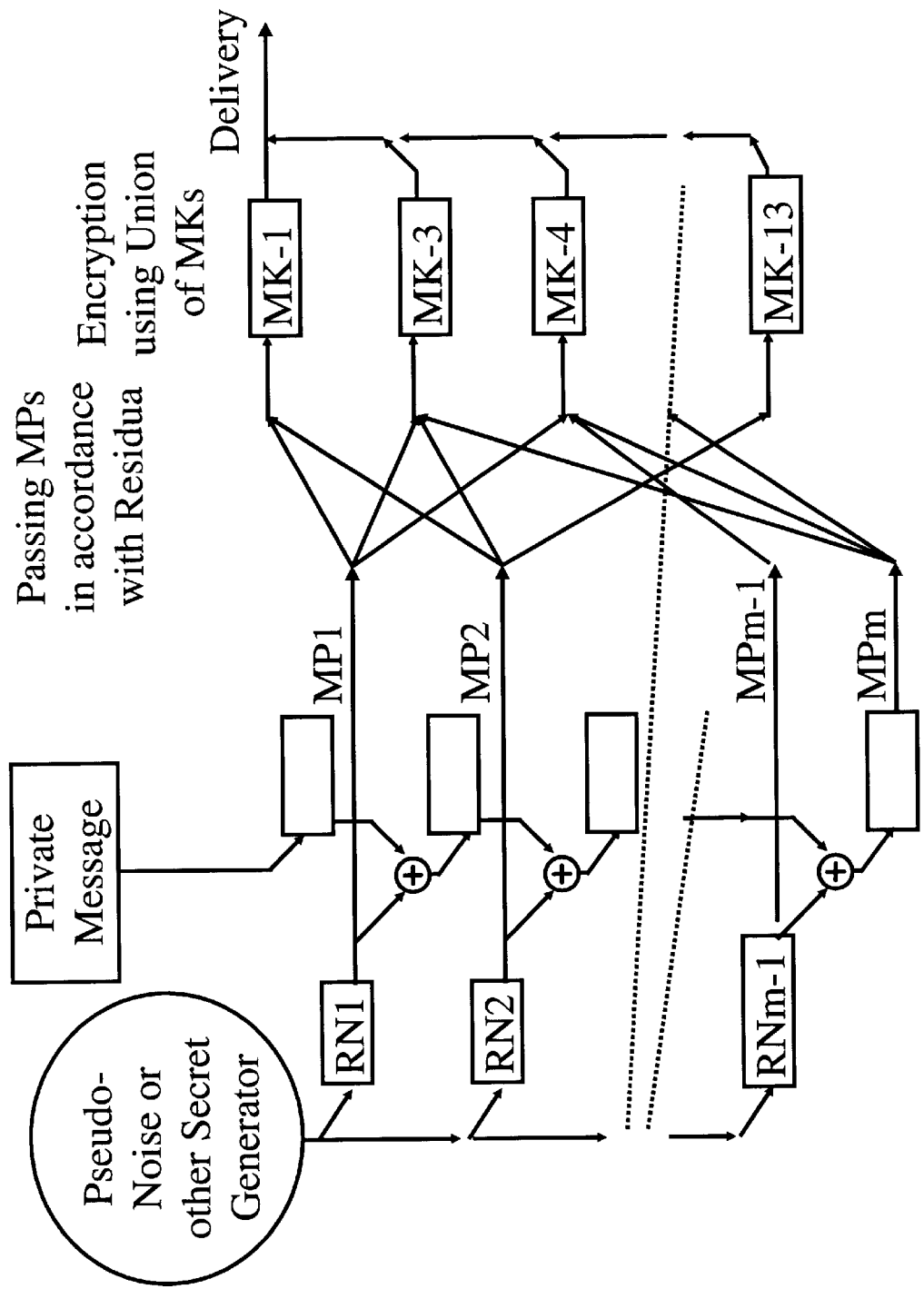
FIG. 8 is a functional diagram of private message decomposition into message-parts and encryption in accordance with the present invention.

Referring to FIG. 8, decomposition of private message into message-parts, a pseudo-noise generator supplies random data used in decomposing a message. Conveying of the information about the Residuum of each of the excluded subscribers is assumed to have occurred at the same time as the list of selected subscribers was transferred. Decomposition of private messages comprises preferably starting with the first message-part initially set to the private message itself, and thereafter generating a message-part, by selecting a random number, preferably whose length is equal to the length of the private message being decomposed. Shorter lengths may leave the private message vulnerable; longer lengths are less efficient. Preferably, the decomposition proceeds by exclusive-ORing the new message-part (the random number) bit-by-bit with the first message-part, and retaining the result as the first message-part. The new message-parts are applied successively to the first message-part by the exclusive-OR process to make all message-parts required to recover the private message.

Once the private message has been decomposed into a sufficient number of message-parts so that there is at least MP for each of the excluded subscriber devices that will not be delivered to that subscriber device, in this example (m), the Residua are computed. A Residuum for an excluded subscriber is the set of crypto-keys from the Union that may be used to send a message-part with no chance of the message-part's being intercepted. Each excluded subscriber device has a key-set and MPs are sent on the Residua of excluded subscriber devices. The arrows represent passing copies of a MP to encryption using a management crypto-key. The example shows some MKs being used for 3 MPs, some for 2 or only 1. The number of message-parts grows quickly, but is not the same for each MK.

The encrypted message-parts are gathered together and encapsulated as needed to deliver them up to the distribution network. Identification is advisable in situations with many private messages or many excluded subscriber devices. If the proportion of excluded subscriber devices is high, other more traditional methods should be entertained.

Using random numbers to decompose the private message is advantageous in that if any message-parts are missing the partial combination of message-parts appears to be a random number. Other decomposition methods, such as shifting or parsing the message, can be used, but the commutative properties of exclusive-OR make it highly desirable. In addition, other lengths of random number can be used, but lengths shorter than the original private message would offer lower security. Any missing random number equal in length to the original private message, using the preferred method, makes breaking the message as difficult as not having any message-parts.

If the private message is a session crypto-key, alternatively, the group manager can generate the session crypto-key (private message) rather than have the source generate it. The same type of random number generator used for the message-parts can be used for this.

Referring to FIG. 9, in an example to exclude SD-A1, SD-Q7 and SD-H6 the Group Manager (GM) cannot send a complete private message, e.g. a new session key, on any MK1 through MK12. Sending the new session key is accomplished by first decomposing the it into 3 parts. SD-A1 has key-set MK1 through MK6, SD-Q7 has key-set MK7 through MK12, and SD-H6 has key-set MK4–6 and MK10–12. The Residua, respectively, then are MK7 through MK12 for A1, MK1 through MK6 for Q7, and MK1–3 plus MK7–9 for H6. MP1 is sent on key-set MK10–12, which is a subset of the intersection of MK1–12 and Residuum-A1. Similarly, MP2 is sent on MK4–6, which is a subset of Residuum-Q7. MP1 and MP3 are pre-combined as would be done in a SD (preferably exclusive-OR) and sent on MK7–9, which is the intersection of Residuum-A1 and Residuum-H6; and MP2 and MP3 are pre-combined and sent on MK1–3, the intersection of Residuum-Q7 and Residuum-H6. Preferably, MP2 and MP3 are random numbers, and MP1 is the session key exclusive-ORed with MP2 exclusive-ORed with MP3. The total number of transmitted MPs is 12 at this point.

All 924 possible SDs except SD-A1, SD-Q7 and SD-H6 above will receive a copy of MP1, MP2 and MP3. SD-A1 will be sent no MP1, and SD-Q7 will be sent no MP2. SD-H6 will receive MP1, and MP2, but not MP3. One SD-M5 has MK1, 2, 3, 7, 8, and 9 and can receive only MP1 pre-combined with MP3 and MP2 pre-combined with MP3. Such a SD would be unable to re-compose from these components the private message, e.g. the session key. For such a SD either MP1, MP2 or MP3 can be supplied in addition on an appropriate MK, making resolution of the private message possible and can be sent using any MK already used to encrypt it: MP1 can be sent on MK7, 8, or 9; MP2 can be sent on MK1, 2, or 3; and MP3 can be sent on MK1, 2, 3, 7, 8, or 9. Only 1 of these is needed. The supplying step, then, is to send one of these alternatives. This means 13 message-part messages are needed, somewhat less than 18 that might maximally be required. By appropriately combining MP1⊕MP3 with MP2 and MP2⊕MP3 with MP1 plus (for SD-M5) MP3 with both MP1⊕MP3 and MP2⊕MP3 all selected SDs will be able to re-compose the private message.

Referring to FIG. 10, in an example of pre-combining of message parts, MP1, MP3, MP4, MP5 and MP13 are shown as 56-bit strings. The bit-by-bit exclusive-OR of the MPs is depicted at the bottom. A preferred identifier is shown, a string of length 15, meaning 15 MPs are needed to re-compose the private message; and the corresponding bit positions in the string showing that the attached message-part pre-combines MP1, 3, 4, 5 and 13.

Figure 11:
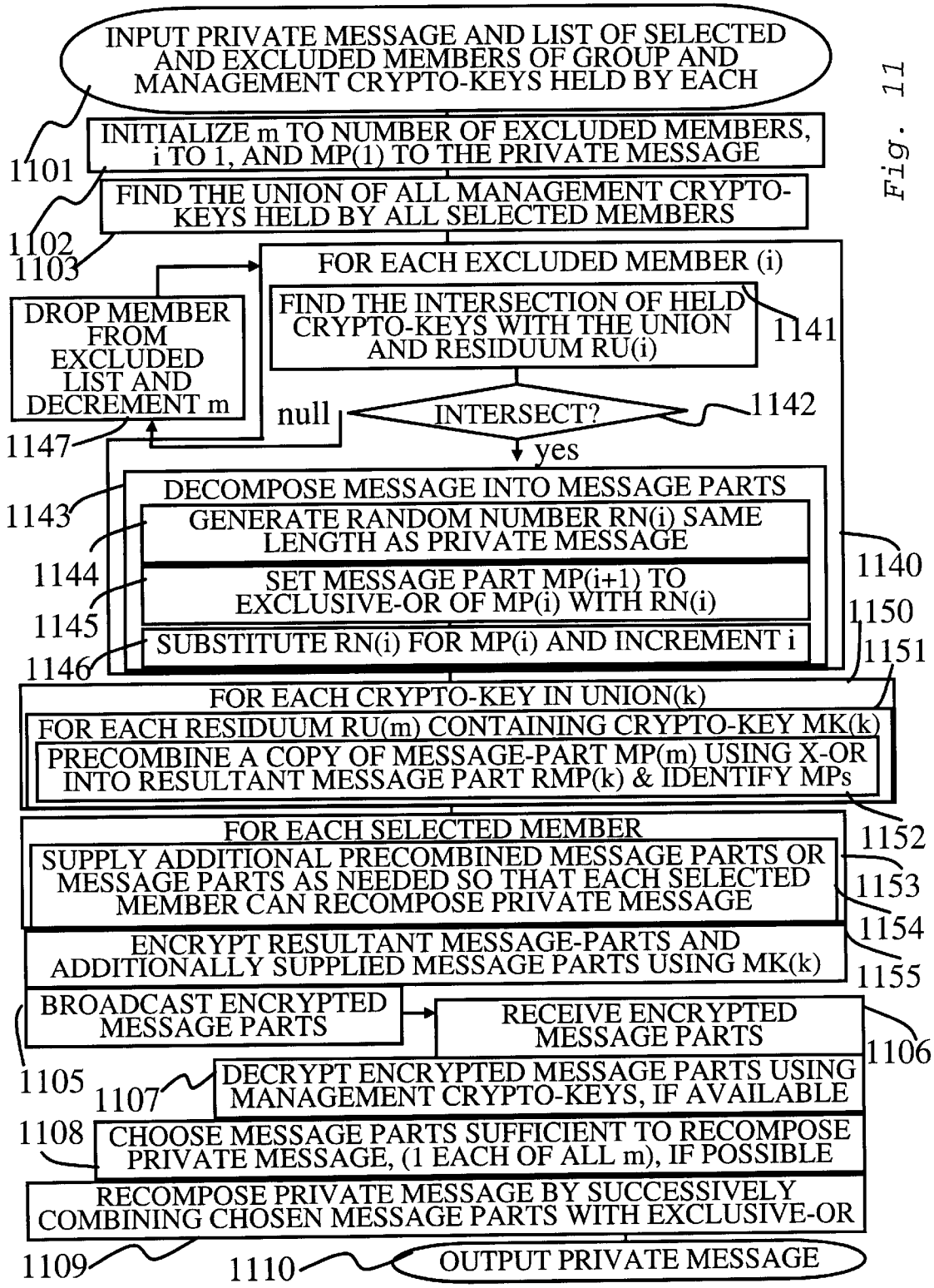
FIG. 11 is a system flow chart of an encrypted selective group broadcast messaging system incorporating pre-combining and supplying in accordance with the present invention.

Referring to FIG. 11, a system flowchart with pre-combining and supplying describes the operations as they occur in the system. A private message, such as a session crypto-key, entering the system along with a list of authorized (selected) recipient subscriber devices starts the process in step 1101. From the list the management key-sets are recalled for the selected subscribers and the Union of those MKs is calculated in step 1103. The select list may contain an enumeration of all authorized subscriber devices, only excluded devices, or may simply name the list to be used with additions or deletions, or both. Thus, the excluded subscriber devices may be enumerated or derived from the list of selected recipients. For each excluded subscriber device the key-set is recalled and compared to the Union in step 1141. If no management crypto-keys are common (null intersection, Residuum equals Union), then the excluded subscriber device will be excluded by no further action than not sending the private message encrypted on the keys in its key-set. No message part is needed for such a subscriber and the number of message-parts is decremented in 1147.

If there is at least one (non-null intersection) common management key, then the Residuum key-set is calculated by taking the remainder of the Union after removing the intersection of the key-set of the excluded subscriber and the Union. The Residua are the management crypto-keys that can be used to convey private message-parts to selected subscriber devices, excluding the particular subscriber device for each Residuum. The first message-part is initially set to the private message itself in step 1102. If all excluded subscriber devices have null intersection with the Union of management crypto-keys of selected subscriber devices, then no decomposition is required. For each excluded subscriber device with a non-null intersection (m), a message-part is generated by decomposing the first message-part or its cumulative decomposition as in step 1145. Other than the first message part, message parts are random numbers of length equal to the private message. The last message part is the cumulative decomposition of the private message successively using all the other message-parts.

The collection of message-parts decomposed from the private message is then pre-combined according to the set of Residua. For each management crypto-key in the Union all Residua with that crypto-key will have their associated message-parts pre-combined in 1150–52.

All selected subscriber devices must receive the private message. In step 1153 the set of receiving selected subscriber devices is checked. Any message-parts that are not available to selected subscriber devices due to pre-combining are supplied in step 1154.

Pre-combined and Supplied message-parts are encrypted for each management key in the Union in 1155. The encrypted message-parts are distributed by broadcast 1105 through the distribution network 104 to at least the selected subscriber devices 101. Distributing encrypted message-parts to other devices, especially the excluded ones, presents no risk of compromise. If the Union of management crypto-keys for the selected subscriber devices covers the entire group already, then again no risk of compromise is presented in distributing more widely than the selected ones, even to non-members, especially since it is assumed that they have no management keys in common with the selected subscriber devices. On reception 1106 of encrypted message-parts, available message-parts if identified are analyzed to choose message-parts sufficient to re-compose the private message in 1108. Message-parts are decrypted 1107 and combined into the private message in 1109. The sequence of decryption followed choosing can be reversed if identification of encrypted message-parts can be accomplished without decryption or is implied in delivery. Decryption of all available message-parts regardless of duplication is possible but uses time and power. Choosing without identifying message-parts can work well if the number of message-part combinations is small. For large numbers of combinations, identification and selection based on optimum choice for time and power and availability is superior. Re-composition of the private message, preferably by exclusive-ORing, from all the message-parts can be accomplished in any order if a commutative function is used (exclusive-OR, e.g.). In step 1110 the private message is disposed of by the output function. A proper disposition may be to route a session crypto-key to the decryption storage area and record its applicability. The private message could just as well be a text message to be routed to a display for a large group to receive privately.

It will further be appreciated that while the system method and apparatus described could also be used for delivery of private messages other than session crypto-keys, the particular required characteristics for conveying session crypto-keys are well matched to the invention; and typical encrypted broadcast messaging techniques can fulfill the required characteristics for delivering ordinary messages not conveying crypto-keys.

The method and apparatus of the present invention for securely broadcasting a message from a source over an insecure communication channel to included communicants, but not to excluded communicants may be implemented in a variety of alternative ways. One broader implementation is to utilize "security devices" in the place of private cryptographic communication keys. A "security device" can include any one of a number of novel or conventional security measures or procedures. For example, as is described in the preferred embodiment, private cryptographic communication keys may be utilized. In accordance with the present invention, symmetrical keys or asymmetrical keys may be utilized. Alternatively, private-public key pairs may be utilized, such as the Diffle-Helman public key protocol. Alternatively, encryption or processing algorithms may be utilized to mask or decompose portions of the transmitted message. Mathematical functions can be utilized to mask portions of the message. For example, a variety of conventional analog or digital functions may be utilized. Methods of processing may also be utilized to encrypt portions of the private message. Software and/or hardware security devices may also be utilized to encrypt portions of the message. Hash functions may be utilized to encrypt portions of the message. Serial numbers unique to particular individuals or computing devices may be utilized to encrypt or mask portions of the message. Clock values may also be utilized if the devices are synchronized in some way. This is a conventional technique utilized in data processing systems in general (typically embodied in a TOD clock). Random number generators may be utilized to generate keys or values for use in encryption operations. Initialization vectors for data processing or hardware devices may be utilized. Additionally, any value determined by a cyclic process (when the processes are all synchronized) may also be utilized in lieu of private cryptographic communication keys. Some of these conventional alternative security devices are depicted in FIG. 12.

Figure 12A:
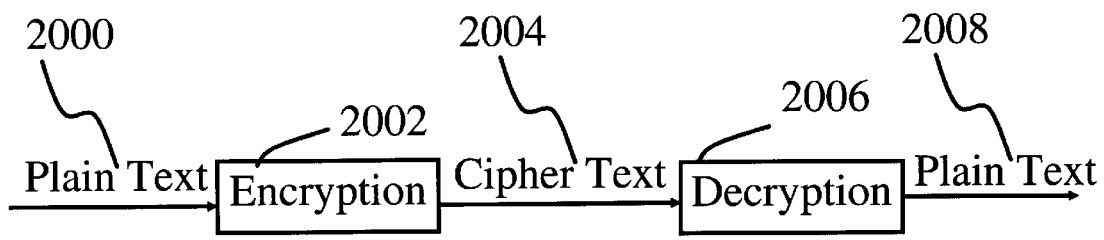
FIG. 12 is a graphical depiction of a plurality of alternative security devices which may be utilized in lieu of, or in combination with, private cryptographic keys, in alternative embodiments of the present invention.

FIG. 12A is a depiction of a simple encryption operation. As is shown, plain text 2000 is supplied to encryption engine 2002 to produce ciphertext 2004. The ciphertext is communicated-over an insecure communication channel and supplied to encryption engine 2006. Decryption engine 2006 operates to generate plain text 2008 which matches plain text 2000.

Figure 12B:
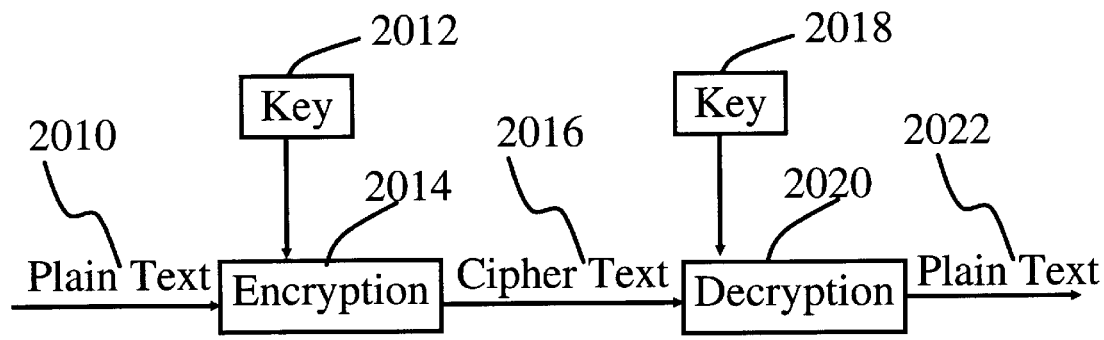

FIG. 12B is a depiction of a symmetric shared-secret private-key encryption operation. As is shown, plain text 2010 is supplied to encryption engine 2014 which is keyed with private key 2012. Encryption engine 2014 generates ciphertext 2016 which is communicated over an insecure communication channel. Ciphertext 2016 is supplied to decryption engine 2020 which is keyed with private key 2018. Decryption engine generates plain text 2022 which matches plain text 2010.

Figure 12C:
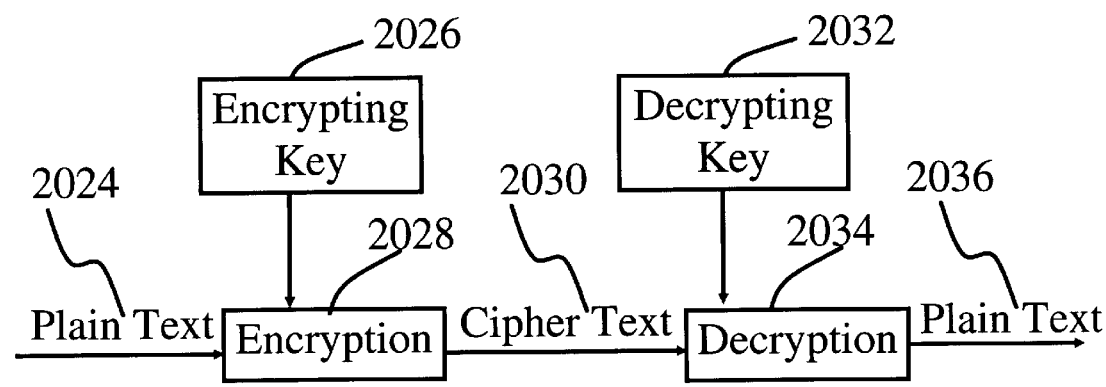

FIG. 12C depicts an asymmetric shared-secret private key encryption process. In this process, encryption key 2026 differs from decryption key 2032. Plain text 2024 supply to encryption engine 2028. Encryption engine 2028 utilizes encryption key 2026 in order to perform encryption operations. Ciphertext 2030 is provided as an output of encryption engine 2028, and is communicated over an insecure communication channel. Ciphertext 2030 is supplied as an input to decryption engine 2043. Decryption engine 2034 utilizes decryption key 2032 to decrypt the ciphertext 2030. Decryption engine 2034 produces plain text 2036 as an output. Plain text 2036 matches plain text 2024.

Figure 12D:
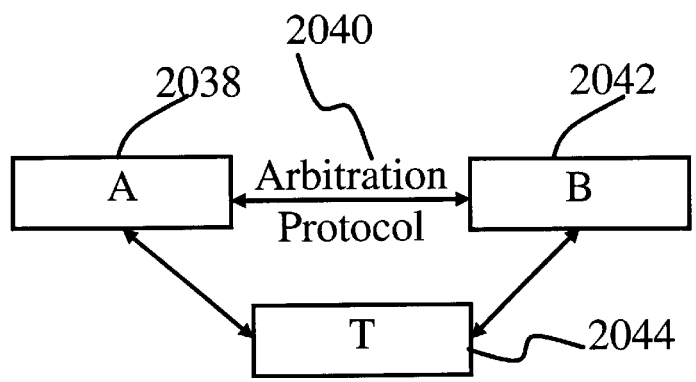

FIG. 12D is a pictorial, representation of an arbitrated encryption protocol. Communicant 2038 communicates with communicant 2042 utilizing an arbitrated protocol 2040. Third party intermediary 2044 is trusted by both communicants and operates to enforce the arbitrated protocol.

Figure 12E:
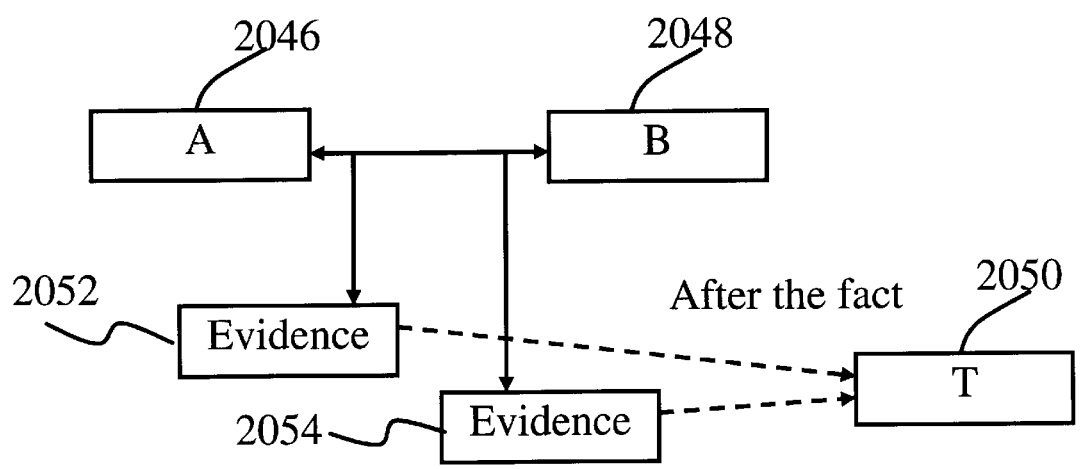

FIG. 12E is a pictorial representation of an adjudicated protocol for transmitting secure messages. As is shown, communicant 2046 communicates with communicant 2048. The communication process generates evidence 2052, 2054 which is provided to trusted adjudicator 2050. The adjudicator utilizes an adjudicated protocol 2054, after the fact, to determine the validity of the communication and communicant identity in order to validate the communication.

Figure 12F:
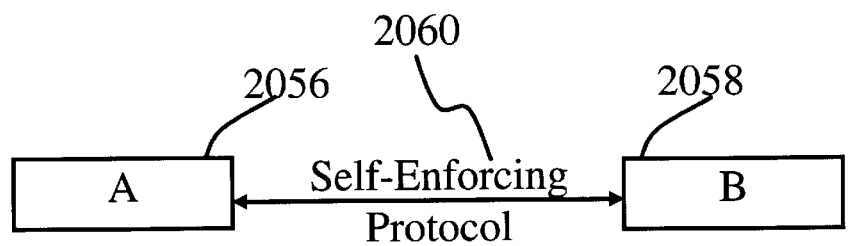

FIG. 12F is a pictorial representation of a self-enforcing protocol. As is shown, communicant 2056 communicates with communicant 2058 utilizing self-enforcing protocol 2060.

Figure 12G:
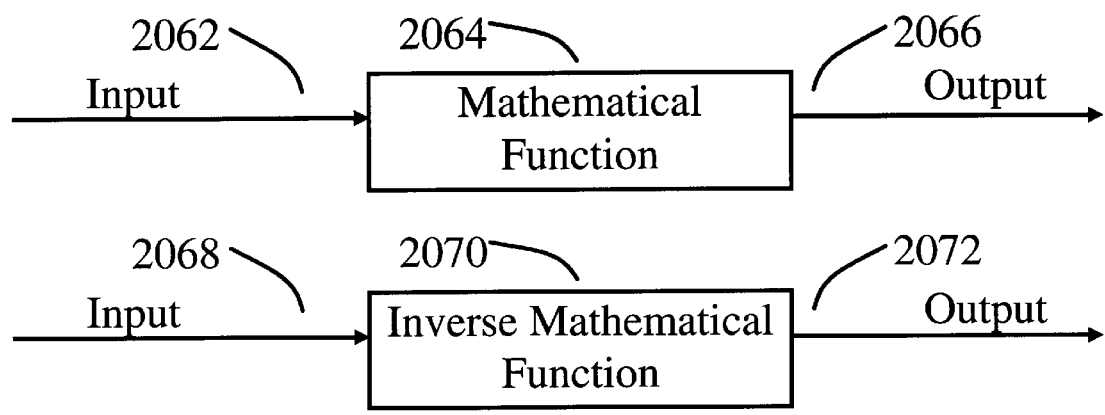

FIG. 12G is a pictorial representation of the utilization of a reversible math function to communicate securely. Input 2062 is provided to math function 2064 which operates on the input and produces a ciphertext output 2066. The output 2066 is communicated over an insecure communication channel. Inverse math function 2070 is utilized to reverse the operation of hash function 2064 and produce output 2072 which matches input 2062.

Figure 12H:
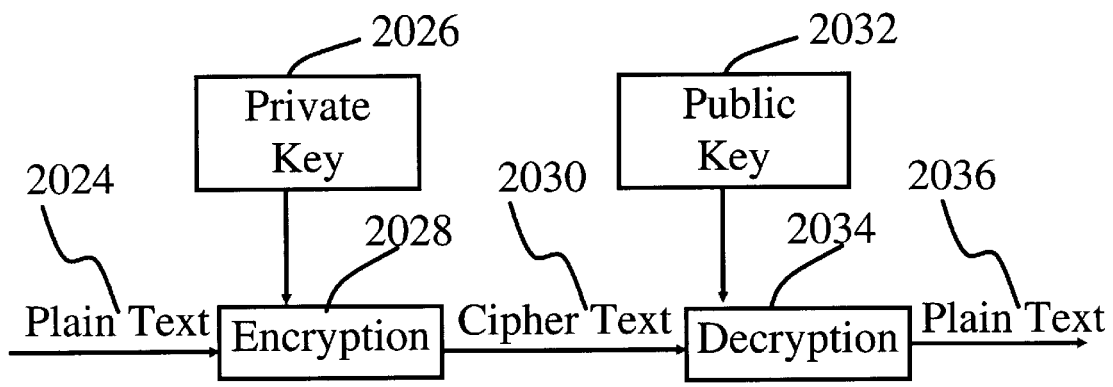

FIG. 12H is a block diagram depiction of an asymmetric private key-public key encryption operation. Utilizing this operation only communicant A can source or generate a message, but any communicant, including recipient B, can read the message. As is shown, communicant A generates an input 2080 which is supplied to encryption engine 2082. The encryption engine is keyed at least in part with private key 2084 in order to generate ciphertext 2086 as an output. Ciphertext 2086 is communicated over an insecure communication channel. Ciphertext 2086 is received by decryption engine 2088 which is keyed with the public key 2090 (which is the public key associated with communicant A). The decryption engine 2088 generates output 2092 which matches input 2080. In this manner, communicant A can generate a message which any other communicant can read utilizing the public key 2090 associated with communicant A. No communicant can impersonate or pose as communicant A since private key 2084 is required in order to generate readable messages.

FIG. 12I is a simplified block diagram depiction of asymmetric private key-public key encryption which allows any communicant A to generate a message, which can only be read by only one communicant B. As is shown, input 2100 is supplied by communicant A as an input to encryption engine 2102. The encryption engine is keyed with the public key 2104 which is associated with communicant B. Encryption engine 2102 generates ciphertext 2106 which is communicated over an insecure communication channel. Ciphertext 2106 is supplied as an input to decryption engine 2110. Decryption engine 2110 utilizes private key 2108 associated with, and known only to, communicant B. Decryption engine 2110 generates an output 2112 which corresponds to input 2100. In this manner, any communicant A can generate a private message which can be read only by communicant B.

FIG. 12J is a simplified pictorial representation of signature operations which may be utilized to secure transmissions. As is shown, input 2120 is utilized to generate both a secure signature and a private message. In order to generate the signature, the input 2120 is supplied to hash function 2122. Hash function 2122 scrambles the input in an irreversible manner. The output of hash function 2122 is supplied to encryption engine 2124 which generates a signature 2126 which is encrypted and which is communicated over an insecure communication channel. The signature 2126 is supplied as an input to decryption engine 2128 which generates an output which is supplied to comparator 2140. The input 2120 is also supplied to encryption engine 2130 which generates as an output ciphertext 2132 which is communicated over an insecure communication channel and which is received by decryption engine 2134. Decryption engine 2134 generates an output 2136 which corresponds to input 2120. The output of decryption engine 2134 is supplied to hash function 2138 which corresponds to hash function 2122; in other words, hash functions 2122 and 2138 operate on an input to generate identical, but random, outputs. The output of hash function 2138 is supplied to comparator 2140. If the value supplied for the signature and the message are the same, then the communication is valid; in other words, communication has originated from an authentic source.

FIG. 12K is a simplified block diagram utilization of initial values and cyclic processes in order to secure communications over an insecure communication channels. As is shown, an initialization value or initialization vector 2144 is generated by a combination of random number 2140 and a time or other cyclic value 2142. The initialization value is supplied to an algorithm or generator 2146. The input 2148 is combined with the output of the algorithm/generator 2146 at exclusive-OR operation 2150. All of these processes are under the control of communicant A. Communicant B or any other authorized communicant has an identical initialization value 2154 which is also supplied to an identical algorithm/generator 2156. The output of algorithm/generator 2156 is supplied as an input to exclusive-OR operation 2158. The other input to exclusive-OR operation 2158 is supplied by exclusive-OR operation 2150 over an insecure communication channel. The output of exclusive-OR operation 2158 is an output 2160 which is identical to input 2148. This is possible due to the unique properties of exclusive-OR operations which are commutative and reversible. Any cyclic process can be utilized in lieu of time values in order to synchronize authorized communicants.

The simplified examples of FIG. 12 represent a variety of conventional security devices which may be utilized in lieu of, or in combination with, private cryptographic communication keys in order to decompose, encrypt, or mask selected portions or segments of the message which is going to be communicated over an insecure communication channel.

In broad overview, in the present invention, some balancing of considerations must be performed in order to determine the total number of private communication keys which are going to be utilized to communicate the message to only the included communicants, while excluding the excluded communicants, and to determine the amount of decomposition or segmentation of the message which must occur. One approach is to favor maximum segmentation and/or decomposition of the message, as opposed to maximum analysis of the key distribution. In other words, one broad approach emphasizes segmentation and/or decomposition and deemphasizes key analysis. This type of analysis is predominated by the total number or excluded communicants. The negative associated with this type of analysis is that it consumes a substantial amount of bandwidth to communicate heavily decomposed or segmented messages.

An alternative approach is to exert an greater effort in analyzing key allocation among the included and excluded communicants in order to minimize the amount of segmentation and number of messages which must be sent in order to communicate the message.

Essentially, some accommodation must be reached between analysis of key allocation and segmentation and/or decomposition of the message. It may be possible that analysis of this problem in terms of a system of linear equations may be found in order to determine the optimum amount of decomposition and/or segmentation and the key identity in order to minimize processing and minimize the bandwidth necessary to securely communicate.

These and other variations will occur to one of ordinary skill in the art, and are not deemed to depart from the scope of the claimed invention.

Thus, it should be clear from the preceding disclosure that the present invention provides a method and apparatus for conveying a private message only to selected member subscriber devices of a group. Advantageously, the method and apparatus retains the high efficiency characteristics of prior art group broadcast encrypted messaging techniques, while adding a significant degree of exclusion of members of the group not selected as well as other unauthorized recipients.

In alterative embodiments of the present invention, it may be beneficial to cascade the message decomposition and encryption operations in order to enhance security and reduce the bandwidth requirements for secure communication. The current embodiment described herein relies heavily upon exclusive or operations, but this is not necessarily the sole means for accomplishing secure communications. Exclusive or operations have certain properties which render them useful in the present case. For example, an exclusive-or operation is its own inverse function. Additionally, exclusive-or operations are commutative. While it may be possible to combine functions which are nonlinear or noncommutative, this may be difficult. Higher order arithmetic functions, such as under a $GF2^m$ field, are commutative, and may be useful. Additionally, rotate and splice string functions can be inverted but are limited in their applicability.

Mathematically, pre-combined parts may cause certain devices performing re-composition to fail, since an odd number of occurrences of each message-part is required under an exclusive-or operation to include the message part and for some devices only an even number may be possible. Hence, in claim 3 the supplying step is inserted. Devices need to choose how to combine parts so that all parts are included. If other functions are used for decomposition, such as GF, then the size of the field will determine how many occurrences are required for each message-part. For example, FG2$^5$ has 32 elements. Any primitive may be selected to use as a combining function, e.g. 1, 31, 5, etc., depending on the field polynomial chosen. Zero is not a useful combining function. A primitive of 1 implies that a message-part must appear once and only once in the final re-composition. Other primitives can be arithmetically combined to get to that result. Thus, if a particular message-part added to itself 3 times is available, its equivalent single appearance can be computed knowing the polynomial. This may help resolve some combinations but the problem of spanning all eigen-vectors.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any stir modifications or embodiments that fall within the scope of the invention.

What is claimed is:

1. A method of securely broadcasting a message from a message source over an insecure communication channel to included communicants but not to excluded communicants, comprising:
   (a) providing a set of private security devices;
   (b) providing a subset of said private security devices to each communicant;
   (c) wherein each communicant has a unique subset of said private security devices taken from said set of private security devices, as compared to all other communicants;
   (d) identifying said included communicants and said excluded communicants and associated private security devices;
   (e) selecting particular ones of said private security devices from said set of private security devices through a combination of:
      (1) analysis of private security device allocation among said included communicants and excluded communicants; and
      (2) potential decomposition of said message into message portions;
   (f) decomposing said message into message portion, with the amount of decomposition being related to the number of excluded communicants;
   (g) utilizing said particular ones of said private security devices which are unavailable to said excluded communicants to secure said particular message portions of said message;
   (h) communicating a secure form of said message over said insecure communication channel; and
   (i) wherein said included communicants may utilize said particular ones of said private security devices to produce said message from said secure form of said message, but wherein said excluded communicants lack the necessary ones of said private security devices to produce said message from said secure form of said message and thereby are excluded from the broadcast.

2. A method of securely broadcasting according to claim 1, wherein said security devices comprise at least one of:
   (1) a cryptographic communication key;
   (2) a protocol;
   (3) an algorithm;
   (4) a mathematical function;
   (5) a method of processing;
   (6) a software security device;
   (7) a hardware security device;
   (8) a hash function;
   (9) a serial number;
   (10) a clock value;
   (11) an initial value;
   (12) a random variable;
   (13) an initialization vector; and
   (14) a value determined by a cyclic process.

3. A method of securely broadcasting according to claim 1, wherein said private security devices comprise cryptographic security devices including at least one of:
   (1) cryptographic algorithms; and
   (2) cryptographic keys.

4. A method of securely broadcasting according to claim 3, wherein said cryptographic security devices comprise asymmetric cryptographic security devices.

5. A method of securely broadcasting according to claim 3, wherein said cryptographic security devices comprise symmetric cryptographic security devices.

6. A method of securely broadcasting according to claim 1, wherein:
   (1) said set of private security devices comprise at least four private security devices; and
   (2) each subset of said private security devices comprise at least two private security devices.

7. A method of securely broadcasting according to claim 1, wherein each of said private security devices has an initial state which is altered after receipt of said message.

8. A method of securely broadcasting according to claim 1, wherein said security devices comprise private cryptographic communication keys.

9. A method of securely broadcasting according to claim 8, wherein said private cryptographic communication keys comprise symmetric private cryptographic communication keys.

10. A method of securely broadcasting according to claim 1:
    (i) wherein said set of private security devices comprise a set of private cryptographic communication keys; and
    (j) wherein said message is segmented into message part; and
    (k) wherein each message part is encrypted utilizing particular ones of said set of private cryptographic communication keys.

11. A method of securely broadcasting according to claim 10, wherein said set of private cryptographic communication keys comprise at least four private cryptographic communication keys.

12. A method of securely broadcasting according to claim 10, wherein particular ones of said private cryptographic communication keys are selected through a combination of:
    (1) analysis of key allocation among said included communicants and excluded communicants; and
    (2) potential segmentation of said message.

13. A method of securely broadcasting according to claim 1, wherein said subset of said private security devices are provided to each communicant substantially according to n-select-n/2.

14. A method of securely broadcasting according to claim 1:
  wherein said private security devices comprise data representing security keys; and
  wherein said subset of said security keys are provided to each communicant substantially according to n-select-n/2.

15. A method of securely broadcasting according to claim 1, wherein said step of decomposing said message into message portions is accomplished by applying an invertible mathematical function to said message which produces a substantially unpredictable output.

16. A method of securely broadcasting according to claim 1, wherein said step of decomposing said message into message portions is accomplished by performing a bit-by-bit exclusive-OR operation on said message and substantially random bits of equal or greater length.

17. A method of securely broadcasting a message from a message source over an insecure communication channel to included communicants but not to excluded communicants, comprising:
  (a) providing a set of private cryptographic communication keys;
  (b) providing a subset of said private cryptographic communication keys to each communicant;
  (c) wherein each communicant has a unique subset of said private cryptographic communication keys taken from said set of private cryptographic communication keys, as compared to all other communicants;
  (d) identifying said included communicants and said excluded communicants and associated private cryptographic communication keys;
  (e) selecting particular ones of said private cryptographic communication keys from said set of private cryptographic communication keys through a combination of:
    (1) analysis of private cryptographic communication key allocation among said included communicants and excluded communicants; and
    (2) analysis of potential decomposition of said message;
  (f) decomposing said message into message parts, with the amount of decomposition being related to the number of excluded communicants;
  (g) utilizing said particular ones of said private cryptographic communication keys which are unavailable to said excluded communicants to encrypt particular portions of said message;
  (h) communicating an encrypted form of said message over said insecure communication channel;
  (i) wherein included communicants may utilize said particular ones of said private cryptographic communication keys to decrypt said message, but wherein said excluded communicants lack the necessary ones of said private cryptographic communication keys to decrypt said message and are thus excluded from the broadcast.

18. A method of securely broadcasting according to claim 17, wherein said private cryptographic command keys comprise asymmetric cryptographic communication keys.

19. A method of securely broadcasting according to claim 17, wherein said private cryptographic command keys comprise symmetric cryptographic communication keys.

20. A method of securely broadcasting according to claim 17, wherein:
  (1) said set of private cryptographic communication keys comprise at least four private cryptographic communication keys; and
  (2) each subset of said private cryptographic communication keys comprise at least two private cryptographic communication keys.

21. A method of securely broadcasting according to claim 17, wherein said step of decomposing said message into message portions is accomplished by applying an invertible mathematical function to said message which produces a substantially unpredictable output.

22. A method of securely broadcasting according to claim 17, wherein said step of decomposing said message into message portions is accomplished by performing a bit-by-bit exclusive-OR operation on said message and substantially random bits of equal or greater length.

23. A method in a encrypted broadcast messaging system for conveying a private message to selected subscriber devices of a group while excluding other subscriber devices in the group, the method comprising the steps of:
  (a) pre-programming from a first set of management security devices a second set of management security devices into each subscriber device of the group, with each second set being unique from all other second sets;
  (b) determining the management security devices held by the selected subscriber devices and the management security devices held by subscriber devices excluded from the group;
  (c) decomposing the private message into message parts, at least one message part for, and associated to, each excluded subscriber device of the group, each message part intended to be secured using management security devices not held by the excluded subscriber devices;
  (d) securing a copy of each of the message parts, one copy for each of a management security devices held by the selected subscriber devices and not any held by the associated excluded device, using the management security devices intended for each message part;
  (e) delivering the secured message parts to at least the selected subscriber devices in the group, identifying the message parts delivered and the message parts needed to re-compose the private message;
  (f) receiving at least one secured message part, identifying the at least one message part received and the at least one message part needed to re-compose the private message;
  (g) reconstructing the at least one received encrypted message part using a management security device;
  (h) choosing from the secured received message parts at least one message part sufficient to re-compose the private message; and
  (i) re-composing the private message by combining the chosen message parts.

24. A method according to claim 23, wherein said management security devices comprise at least one of:
  (1) a cryptographic communication key;
  (2) a protocol;
  (3) an algorithm;
  (4) a mathematical function;
  (5) a method of processing;
  (6) a software security device;
  (7) a hardware security device;

(8) a hash function;
(9) a serial number;
(10) a clock value;
(11) an initial value;
(12) a random variable;
(13) an initialization vector; and
(14) a value determined by a cyclic process.

25. A method according to claim 23, wherein said management security devices comprise cryptographic security devices including at least one of:
   (1) cryptographic algorithms; and
   (2) cryptographic keys.

26. A method of securely broadcasting according to claim 25, wherein said cryptographic security devices comprise asymmetric cryptographic security devices.

27. A method of securely broadcasting according to claim 25, wherein said cryptographic security devices comprise symmetric cryptographic security devices.

28. A method of securely broadcasting according to claim 23, wherein:
   (1) said set of management security devices comprise at least four management security devices; and
   (2) each subset of said management security devices comprise at least two management security devices.

29. A method of securely broadcasting according to claim 23, wherein said management security devices comprise private cryptographic communication keys.

30. A method of securely broadcasting according to claim 29, wherein said private cryptographic communication keys comprise symmetric private cryptographic communication keys.

31. A method of securely broadcasting according to claim 23:
   (i) wherein said set of management security devices comprise a set of management cryptographic communication keys; and
   (j) wherein said message is segmented into message part; and
   (k) wherein each message part is encrypted utilizing particular ones of said set of management cryptographic communication keys.

32. A method of securely broadcasting according to claim 31, wherein said set of management cryptographic communication keys comprise at least four private cryptographic communication keys.

33. A method of securely broadcasting according to claim 31, wherein particular ones of said private cryptographic communication keys are selected through a combination of:
   (1) analysis of key allocation among said included subscribers and excluded subscribers; and
   (2) potential segmentation of said message.

34. A method of securely broadcasting according to claim 23, wherein said subset of said management security devices are provided to each subscriber substantially according to n-select-n/2.

35. A method of securely broadcasting according to claim 23:
   wherein said management security devices comprise data representing security keys; and
   wherein said subset of said security keys are provided to each subscriber substantially according to n-select-n/2.

36. A method of securely broadcasting according to claim 23, wherein said step of decomposing said message into message portions is accomplished by applying an invertible mathematical function to said message which produces a substantially unpredictable output.

37. A method of securely broadcasting according to claim 23, wherein said step of decomposing said message into message portions is accomplished by performing a bit-by-bit exclusive-OR operation on said message and substantially random bits of equal or greater length.

38. A method in a encrypted broadcast messaging system for delivering a private message to selected subscriber devices of a group while excluding other subscriber devices in the group, the method comprising the steps of:
   (a) determining the management crypto-keys held by the selected subscriber devices and the management crypto-keys held by subscriber devices excluded from the group;
   (b) decomposing the private message into a message-part, at least one message-part for and associated to each excluded subscriber device of the group;
   (c) copying the message-parts, one copy for each of a management crypto-key held by the selected subscriber devices and not any held by the associated excluded device, each message-part intended to be encrypted using the held management crypto-keys;
   (d) encrypting each of the message-parts using the management crypto-keys intended for each message-part; and
   (e) delivering the encrypted message-parts to at least the selected subscriber devices in the group, identifying the message-parts delivered and the message-parts needed to re-compose the private message.

39. The method in claim 38, wherein the copying step further includes a pre-combining step and a supplying step, to pre-combine all message-part copies to be encrypted using a particular management crypto-key into a first resultant message-part, the combining equivalent to that in a subscriber device and identifying the message-parts constituting the resultant, and to supply second resultant message-parts sufficient for all selected subscriber devices to re-compose the private message from delivered resultant message-parts.

40. A method in a encrypted broadcast messaging system for obtaining a private message by selected subscriber devices of a group excluding other subscriber devices in the group, the method comprising the steps of:
   (a) pre-programming from a first set of at least two management crypto-keys a second set of management crypto-keys into each subscriber device of the group, each second set being unique from all other second sets;
   (b) receiving at least one encrypted message-part, identifying the at least one message-part received and the at least one message-part needed to re-compose the private message;
   (c) decrypting the at least one received encrypted message-part using a management crypto-key;
   (d) choosing from the decrypted received message-parts at least one message-part sufficient to re-compose the private message; and
   (e) re-composing the private message by combining the chosen message-parts and passing it to a destination.

41. A subscriber device comprising:
(a) a receiving interface for receiving secure message parts;
(b) a processing system coupled to the receiving interface for processing the received secure message parts;
(c) wherein the processing system is programmed to produce the message parts from the received secure message parts using preprogrammed security devices from a set of available security devices;
(d) wherein said preprogrammed security devices associated with said receiving interface are unique from all others;
(e) wherein the processing system is programmed to choose from the message parts at least one message part sufficient to re-compose a private message;
(f) and wherein the processing system is programmed to re-compose the private message by combining the chosen decrypted message parts; and
(g) an output interface coupled to the processing system for presenting the private message to its destination.

42. A subscriber device according to claim 41, wherein said security devices comprise at least one of:
(1) a cryptographic communication key;
(2) a protocol;
(3) an algorithm;
(4) a mathematical function;
(5) a method of processing;
(6) a software security device;
(7) a hardware security device;
(8) a hash function;
(9) a serial number;
(10) a clock value;
(11) an initial value;
(12) a random variable;
(13) an initialization vector; and
(14) a value determined by a cyclic process.

43. A subscriber device according to claim 41, wherein said private security devices comprise cryptographic security devices including at least one of:
(1) cryptographic algorithms; and
(2) cryptographic keys.

44. A subscriber device according to claim 43, wherein said cryptographic security devices comprise asymmetric cryptographic security devices.

45. A subscriber device according to claim 43, wherein said cryptographic security devices comprise symmetric cryptographic security devices.

46. A subscriber device according to claim 41, wherein:
(1) said set of available security devices comprise at least four private security devices; and
(2) each subset of said preprogrammed private security devices comprise at least two private security devices.

47. A subscriber device according to claim 41, wherein said subset of said private security devices are provided to each subscriber substantially according to n-select-n/2.

48. A subscriber device according to claim 41:
wherein said private security devices comprise data representing security keys; and
wherein a subset of said security keys are provided to each subscriber substantially according to n-select-n/2.

49. A subscriber device according to claim 41, wherein said message is decomposed into message portions by applying an invertible mathematical function to said message which produces a substantially unpredictable output.

50. A subscriber device according to claim 41, wherein said message is decomposed into message portions by performing a bit-by-bit exclusive-OR operation on said message and substantially random bits of equal or greater length.

51. A group manager comprising:
(a) a source interface for receiving private messages and list of selected subscriber devices to receive the private message;
(b) a processing system coupled to the source interface for processing the received list of selected subscriber devices and excluded subscriber devices plus their associated keys into key-sets and for processing the private message into message-parts;
(c) wherein the processing system is programmed to determine the management crypto-keys held by the selected subscriber devices and the management crypto-keys held by the excluded subscriber devices;
(d) wherein the processing system is programmed to decompose the private message into a message-parts, all of which are required to recompose the private message, at least one message-part for and associated to each excluded subscriber device that has a management key in common with an included subscriber device, wherein the processing system is programmed to copy the message-parts, one copy for each of a management crypto-key held by the selected subscriber devices and not held by the associated excluded device, each message-part intended to be encrypted using the held management crypto-keys, and wherein the processing system is programmed to encrypt each of the message-parts using the management crypto-keys intended for each message-part, and deliver the encrypted message-parts to at least the selected subscriber devices in the group, in a form usable by the included subscriber devices to recompose the private message; and
(e) a distribution interface coupled to the processing system for presenting the encrypted message-part messages to a broadcast network.

52. A group manager according to claim 51, wherein the number of message-parts necessary to securely broadcast is reduced by pre-combing message parts prior to transmission.

* * * * *